United States Patent [19]

Crane

[11] 4,059,852

[45] Nov. 29, 1977

[54] INFLATABLE SUIT FOR CYCLISTS

[76] Inventor: Stanley J. Crane, 1771 N. Vermont Ave., Los Angeles, Calif. 90027

[21] Appl. No.: 689,244

[22] Filed: May 24, 1976

[51] Int. Cl.$^2$ .................... B60R 21/00; A41D 13/00
[52] U.S. Cl. ........................................... 2/2; 280/733
[58] Field of Search ................ 2/2, DIG. 3; 280/730, 280/733; 9/316, 319, 340

[56] References Cited

U.S. PATENT DOCUMENTS

| 3,682,498 | 8/1972 | Rutzki | 280/733 |
| 3,865,398 | 2/1975 | Woll | 280/733 |
| 3,921,944 | 11/1975 | Morrison | 2/2 X |
| 3,930,667 | 1/1976 | Osuchowski | 2/DIG. 3 |

Primary Examiner—Werner H. Schroeder
Assistant Examiner—Peter Nerbun
Attorney, Agent, or Firm—Whann & McManigal

[57] ABSTRACT

A protective garment for minimizing impact-caused injury, primarily to the body of a motorcyclist, comprising a body-part-enclosing covering means including an effectively hollow body-part-contoured inflatable bag provided with ingress port means and exterior inflating tube means communicating the ingress port means and pressurized gas supply means and the normally closed ingress valve means relative to fixed portions of a motorcycle for forcible opening actuation of the normally closed ingress valve means upon forced abrupt separation of a motorcyclist's body from a motorcycle as a result of an accident, for causing the rapid discharge of compressed gas through the open ingress valve means, inflating tube means, and ingress port means into the inflatable bag whereby to bring about abrupt inflation thereof in a body-protecting manner. In a preferred form, the inflating tube means is provided with controllably manually engageable and disengageable coupling means for allowing selective mounting and dismounting of a motorcyclist relative to a motorcycle without causing forced opening of the ingress valve means and the consequent abrupt inflation of the inflatable bag.

5 Claims, 5 Drawing Figures

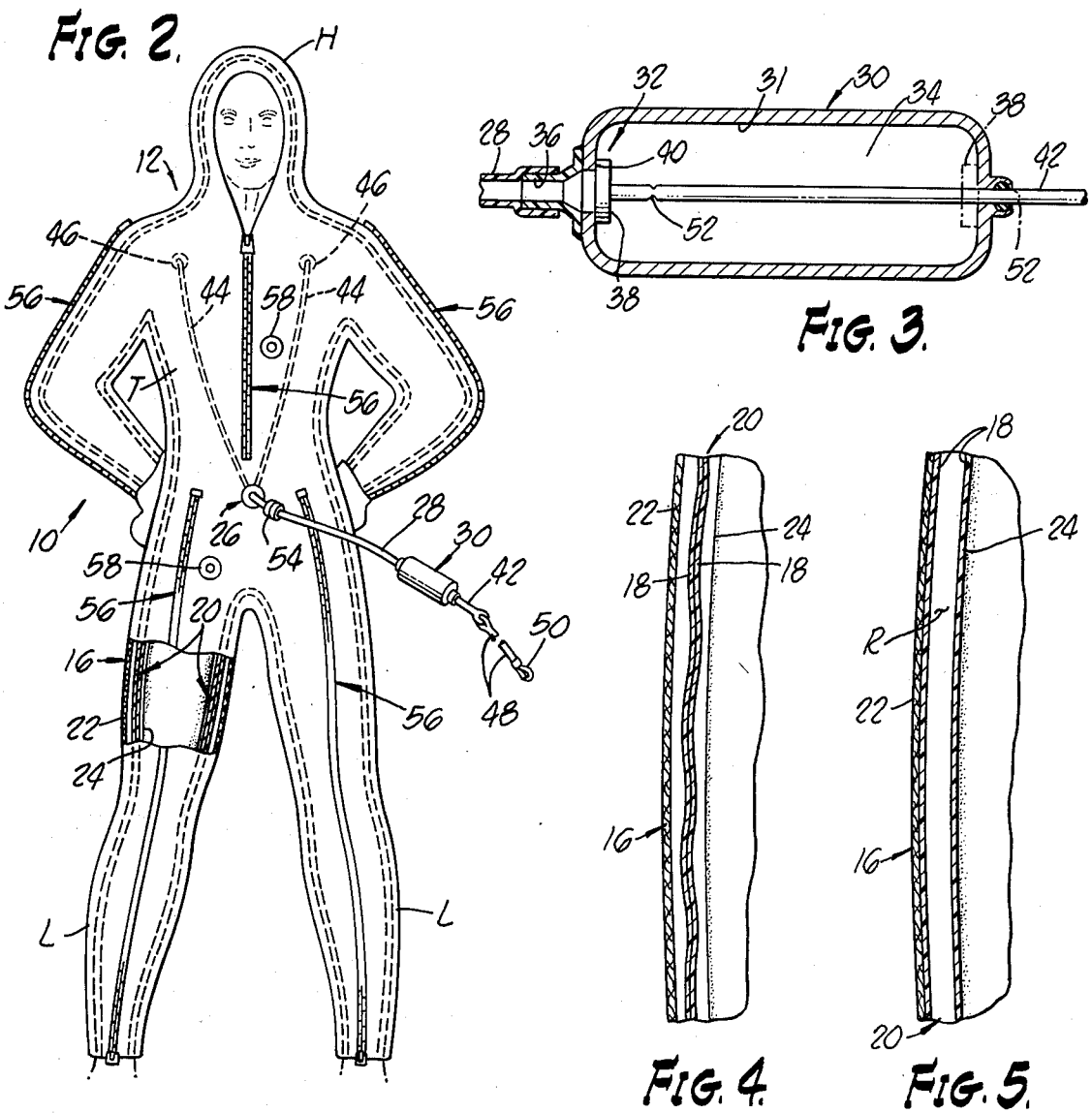

INFLATABLE SUIT FOR CYCLISTS

BACKGROUND OF THE INVENTION

It is common practice for a motorcyclist to attempt to protect himself from injury by wearing protective head gear, such as a safety helmet or the like, and also partially protective exterior clothing which usually has a leather exterior, or the like, intended primarily to minimize exterior friction-caused damage to surface portions of a motorcyclist's body if he is thrown from the motorcycle during an accident. Such relatively thick leather-surfaced garments may provide a minor degree of cushioning effect, but this is very limited in magnitude and is relatively ineffective. Other prior art efforts to provide protection for a motorcyclist have included various forms of equipment added to or effectively modifying the complete composite structure of a motorcycle for the purpose of minimizing various types of accident hazards, but the general status of all such protective devices for a motorcyclist is relatively unsatisfactory from the standpoint of the limited efficacy thereof.

The art known to Applicant is disclosed in the following U.S. Pat. Nos.
Chatham, et al: 2,871,849
Cummins: 3,319,260
Hatton: 3,823,711
Morel: 3,823,712
Hatton: 3,868,952
Amarantos: 3,895,396

SUMMARY OF THE INVENTION

It is an object of the present invention to provide a protective garment primarily intended for use by a motorcyclist and/or other vehicle rider intended for minimizing impact-caused injuries to the body of a motorcyclist and which effectively comprises an emergency-condition-inflatable, body-protecting, inflatable garment or suit worn by the motorcyclist, usually encompassing most of the motorcyclist's body and, in a preferred form, also most of the motorcyclist's head, and adapted to be inflated by pressurized gas in response to forced, abrupt separation of the motorcyclist's body from a motorcycle, such as would occur as a result of the abrupt impact associated with a motorcycle accident.

It is another object of the invention to provide such a protective emergency-condition-inflatable suit for a motorcyclist's body which will normally be inoperative and function as an ordinary uninflated outer garment during normal operation of a motorcycle and which will only become operative and inflated as a result of abrupt separation of the motorcyclist's body from a motorcycle in an unintended manner.

It is a further object of the invention to provide a protective garment of the character referred to in the preceding object which is provided with controllably manually engageable and disengageable coupling means so as to allow the easy mounting and dismounting of the motorcyclist relative to a motorcycle without causing the abrupt inflation of the protective garment or in any manner altering it from its normal functioning as an apparently conventional outer garment.

It is another object of the invention to provide a protective garment of the type referred to hereinbefore which is provided with means for quickly mounting it with respect to a conventional motorcycle whereby to provide for its usage as original equipment on a motorcycle or as a retrofit apparatus adapted to be easily attached to a pre-existing, entirely conventional motorcycle.

It is a further object of the present invention to provide a protective garment of the character referred to hereinbefore wherein the inflatable protective garment is provided with a plurality of normally closed, access-facilitating, controllably openable closure means to make it easy to gain quick access to virtually all portions of a motorcyclist's body after an accident has occurred, so that quick treatment can be provided for any injuries which may have resulted from the accident despite the injury-minimizing functioning of the inflated protective garment. These, also, facilitate getting into and out of the garment.

It is a still further object of the present invention to provide a protective garment of the character referred to hereinbefore, including effectively delayed-emptying-action egress valve means connected to the inflatable bag and operable in a manner such as to allow the accident-caused inflated bag to become deflated after a short time-delay interval following an accident, to facilitate removal of the protective garment from the body of a motorcyclist and to facilitate easy access to various portions of the body of a motorcyclist very soon after an accident, in the event that the motorcyclist has sustained any injuries which require treatment.

The apparatus of Applicant's invention is relatively inexpensive to manufacture, from the standpoint of capital investment, including tooling and production set-up cost, and from the standpoint of individual per-item cost of manufacture thereafter.

Additionally, the protective garment of Applicant's invention is easy and relatively convenient to use and does not place any major limitations or restrictions on free movement of a motorcyclist and additionally is easy to mount and dismount with respect to a motorcycle, either initially at the time of manufacture or in a retrofit manner and does not provide any major encumbrances or excessive obstructive equipment or apparatus to be carried by the motorcycle.

Other objects and particular features of the invention will be pointed out in the following detailed description of a preferred form of the invention.

BRIEF DESCRIPTION OF THE DRAWINGS

FIG. 1 is a reduced-size side elevational view of one exemplary embodiment of the invention showing a motorcyclist wearing the protective garment and sitting on a motorcycle coupled to the pressurized gas supply means of the apparatus and with the protective garment in a normal uninflated condition;

FIG. 2 is a front elevational view of the protective garment worn by the motorcyclist, with a right-leg portion thereof partially broken away in a vertical, sectional plane to illustrate the interior construction of the protective garment;

FIG. 3 is a greatly enlarged sectional view taken substantially along a longitudinal central plane of a representative front of one of the two pressurized gas supply means illustrated in FIG. 1 taken substantially along line 3—3 of FIG. 1;

FIG. 4 is an enlarged, fragmentary, vertical sectional view of the representative outer side part of the protective garment shown fragmentarily in vertical section in the right-leg portion of the protective garment, as illustrated in FIG. 2, and effectively comprises an enlargement thereof with the inner inflatable bag in uninflated condition; and FIG. 5 is an enlarged, fragmentary, vertical sectional view of the same right-leg portion of the protective garment illustrated in FIG. 4, but in the case of FIG. 5, shown with the inner inflatable bag in inflated condition such as occurs as a result of the forcible separation of the body of the motorcyclist from the motorcycle of FIG. 1 as a result of an accident occurring.

DESCRIPTION OF THE PREFERRED EMBODIMENT

Referring to the drawings, a motorcyclist indicated generally at 10, is shown wearing the protective garment, indicated generally at 12, while seated on a motorcycle, indicated generally at 14 in FIG. 1. The protective garment, as illustrated in FIG. 1, is in a pre-operative condition such that if and when the motorcyclist 10 has an accident and is thrown from the motorcycle 14, the protective garment 12 will be immediately inflated in a manner similar to the fragmentary showing of such inflation in FIG. 5, as will be described hereinafter. This will protect the motorcyclist's body when it strikes any nearby ground surface, pavement surface, or the like, so that any injuries will be minimized.

In the example illustrated, the protective garment, indicated generally at 12, comprises body-part-enclosing covering means, such as is best shown at 16 in the sectional views of a representative right-leg portion of the protective garment, shown in enlarged fragmentary detail in FIGS. 4 and 5. The body-part-enclosing covering means, indicated generally at 16, is also shown in vertical section in FIG. 2, although drawn to a smaller scale than the showings of FIGS. 4 and 5.

It should be clear that the entire protective garment 12 is made up of extended portions of the body-part-enclosing covering means, indicated generally at 16, in the representative vertical sectional showing of the right-leg portion thereof.

The covering means 16, in the exemplary form of the invention illustrated, may be said to effectively comprise a body-enclosing suit enclosing limb and torso portions of the motorcyclist's body 10 and also includes a hood-shaped portion enclosing and protecting major parts of a head portion of the motorcyclist's body 10. The complete assembly of the limb and torso portions of said body-enclosing suit and the hood-shaped, head-protecting portion thereof comprise the previously mentioned complete protective garment generally designated by the reference numeral 12. The head-protecting, hood-shaped portion of the protective suit is indicated at H, while the limb-protecting portions of said suit are indicated at L. The torso-protecting portion of the suit is indicated at T. It will be understood that the various portions indicated at L, T and H together comprise the complete protective garment generally indicated at 12.

The covering means 16, of which the complete protective garment 12 is made, has at least two adjacent layers of flexible gas-impervious material, indicated at 18, which are effectively edge-joined together to form an effectively-hollow, body-part-contoured inflatable bag, which is generally designed by the reference numeral 20. The inflatable bag 20 may be made of thin-sheet rubber material, flexible gas-impervious plastic material such as polyethylene, or any other suitable thin-sheet material having the desired gas-impervious characteristic and flexibility characteristic.

The covering means 16 also includes at least one outer layer of a desired garment-fabric design-simulating appearance, such as the outer layer of fabric indicated at 22 and which might be denim, any desired fabric, leather, or any other appropriate and/or desired exterior layer of material. In the example illustrated, there is also a corresponding inner layer of material 24, forming with the outer layer 22, a double layer of fabric, or the like, carrying therebetween the double-walled, inflatable bag 20, as is best shown in FIG. 4 when the bag is in uninflated condition and in FIG. 5 when the bag is in inflated condition. The inflatable bag 20 may be merely positioned within the opening defined between the inner and outer fabric layers 24 and 22 or one or the other of the walls of the inflatable bag may be appropriately attached thereto, such as by being adhesively or otherwise bonded along desired exterior surface wall portions of one or the other of the two flexible gas-impervious walls 18 of the inflatable bag 20. In other words, the mounting of the inflatable bag with respect to either a single outer fabric wall 22 or within a double layer of fabric walls 22 and 24, as shown in FIGS. 4 and 5, may take any suitable form.

The inflatable bag 20 has a hollow interior region which can best be seen at R in FIG. 5, where said inflatable bag 20 is inflated, and said inflatable bag 20 is provided with ingress port means, such as indicated at 26 in FIGS. 1 and 2, communicating the exterior of the inflatable bag 20 and the hollow interior region R thereof.

It should be noted that in the exemplary form of the invention illustrated, there are two such ingress port means 26 positioned at front and rear portions of the protective garment 12 for the corresponding communication with front and rear interior regions of the hollow bag 20 forming corresponding front and rear parts of the protective garment 12.

Exterior inflating tube means or inlet means are provided, as indicated at 28, and, in the example illustrated, are two in number, located at the front and rear of the protective garment 12 for connection to the corresponding front and rear ingress or inlet port means 26.

The two front and rear exterior inflating tube means are indicated by the reference numeral 28 in each case and, while each is connected at its inner end to the corresponding ingress port means 26, it is connected at its outer end to a corresponding one of two separate front and rear pressurized gas supply means indicated at 30. Each of the two pressurized gas supply means 30 is of similar construction, although positionally reversed, and comprises a suitable pressure vessel 31, preferably of metallic construction.

It is believed that the following description of the representative front one of said two pressurized gas supply means 30 provide an entirely adequate disclosure of each of same inasmuch as it is fully applicable to the rear pressurized gas supply means 30, with the exception of the fact that the left and right ends thereof are reversed from the showing of FIG. 3.

As best illustrated in FIG. 3, the representative front pressurized gas supply means 30 includes normally closed ingress valve means, indicated at 32, connected between a hollow interior region 34 containing a desired quantity of pressurized gas and the apertured fitting or nipple 36 at the outer end of the corresponding front inflating tube means 28.

The just described connection is such that the normally closed ingress valve means 32 effectively isolates the pressurized gas supply means 30 from the corresponding inflating tube means 28 until such time as an accident occurs and the valve member 38 of the ingress valve means 32 is forcibly moved away from the valve seat 40 toward a rightwardly extreme position, as shown in phantom lines at 38 in FIG. 3. This accident-caused rightward movement of the valve member 38 away from the valve seat 40, with the consequent opening of the valve 32, allows compressed gas within the pressurized gas supply means 30 to feed leftwardly through the valve 32, the inflating tube means 28, and the front ingress port means 26 into the hollow interior region R of the inflatable bag 18.

Thus, the inflatable bag 20 will be quickly inflated from a normal collapsed condition, as best shown in fragmentary sectional detail in FIG. 4, into an inflated condition such as is best shown in fragmentary sectional detail in FIG. 5. This will occur whenever the valve member 38 is forcibly displaced from its normally closed leftward extreme position as shown in FIG. 3 into a rightwardly displaced open position, which will occur whenever sufficient tension is applied to the tension member 42 connected to the valve member 38.

Precisely the same situation prevails with respect to the rear-positioned pressurized gas supply means 30, which has the same structure as FIG. 3, but in a left-to-right reversed orientation.

Thus, it can be seen that forward tension applied to the forward tension member 42 and corresponding rearward tension applied to the functionally equivalent rear tension member 42 will activate both of the two ingress valve means similar to the representative front one shown at 32 in FIG. 3 into an open condition, allowing both of the pressurized gas supply means 30 to discharge pressurized gas through the corresponding front and rear inflating tube means 28 and through the corresponding front and rear ingress port means 26 into the corresponding front and rear portions of the hollow interior region R of the hollow bag 20. This will cause inflation rate of the hollow bag 20.

The inflation rate of the hollow bag 20 is further increased, in the exemplary form of the invention illustrated, by the provision of additional or auxiliary inflating tubes 44 which connect from the main inflating tube 28 at both the front and rear and extend upwardly through additional front and rear pairs of auxiliary ingress port means 46 positioned at locations spaced from the primary or main front and rear ingress port means 26. This merely increases the rapidity of the rate of inflation of the hollow inflatable bag 20.

The previously mentioned front and rear tension members 42 may comprise effective connecting rods carried respectively, by each of the two valve members similar to the representative one shown at 38 in FIG. 3, and with each having an extended and usually flexible tension member portion 48, which is provided with suitable fastening means 50 for attachment to a corresponding front or rear portion of the motorcycle 14. Each of the two fastening means 50 may be a hook of either a fixed type or a controllably openable or closable type adapted to be connected through a corresponding apertured portion of the motorcycle frame or any other functional equivalent thereof.

The arrangement is such that the body 10 of the motorcyclist is not inconvenienced when in the attached condition illustrated in FIG. 1 and he is perfectly free for normal motorcycle driving movement. However, in the event that the motorcycle 14 strikes some obstacle or is caused to abruptly alter its normal straight-line path of travel so that the motorcyclist's body 10 is thrown from the motorcycle 14, tension will be applied by each of the two tension members comprising the connecting rods 42 and the flexible-tension extension members 48. This will effectively open each of the normally closed ingress valve means, such as the representative one shown at 32 in FIG. 3, and immediately feed the pressurized gas from the two pressurized gas supply means 30 into front and rear portions of the inflatable bag 20 of the protective garment 12 and cause it to be inflated rapidly enough to act as a shock-absorbing, protective outer layer when the motorcyclist impacts on a nearby ground or pavement surface.

To provide for effective separation of the motorcyclist's body 10 from the valve-activating means 42 and 48, a weakened portion 52 is provided in each of the two connecting rods 42, as illustrated with respect to the exemplary front connecting rod 42 in FIG. 3, which will allow the connecting rods 42 to each become broken and separated at the location of the weakened portion 52 when the valve member 38 is forcibly impacted against the remote end of the inside of the pressurized gas supply means 30, such as is illustrated in the phantom line right-hand extreme position thereof shown in FIG. 3. These parts 42, 48 and 50 constitute detachable means which functions upon being pulled to separate the compressed gas receptacle 30 from the vehicle and to open the valve 38.

Corresponding front and rear breakage of the connecting rod tension members 42 will allow the body of the motorcyclist 10 to completely separate from what is left of the two connecting rods 42 after such breakage and from the corresponding and flexible extension portions 48 attached to fixed portions of the motorcycle 14.

In order to make it possible for the motorcyclist to get on and off of the motorcycle whenever he desires without inadvertently activating and opening one or the other of the two ingress valve means 32, each of the two exterior inflating tube means 28 is provided with a controllably manually engageable and disengageable coupling 54 which is of the quick-engageable and quick-disengageable type well known in the art and which usually requires merely a very slight manual twisting movement to either engage or disengage same. Each of said coupling means 54 is of course of a pneumatic-tight type or gas-tight type such as are well known in the art and, therefore, not shown or described in detail.

In the example illustrated, the protective garment 12 is provided with a plurality of normally closed, access-facilitating, controllably openable closure means, such as designated at 56 in each of a plurality of different desired locations, and each is shown as comprising a conventional mechanical fastener of a type commonly known as a "Zipper", although effective multiple hook-and-catch type fasteners or closure means of the variety commonly known as "Velcro" fasteners, or other equivalent mechanical fasteners or closure means, may be employed in lieu of the exemplary "Zipper" fasteners shown at 56. These provide for quick access to the body of a motorcyclist in the event that he has been injured in an accident despite the protective garment enclosing most of his body and head, and such closure means may be located in a variety of different positions as desired.

Optionally, the protective garment 12 may include one or more effectively delayed-emptying-action egress valve means, such as shown very diagrammatically at 58, which may be positioned in as many differently spaced locations as thought desirable for the effectively delayed-emptying-action which they are to perform. It should be noted that they may comprise restricted or limited area bleed holes or egress port means of sufficiently small enough total cross-sectional area to not interfere to any major extent with the initial rapid inflation of the hollow inflatable bag 20 within the entire protective garment 12 immediately following an accident, but which will then come into effective operation as slow-emptying-action egress valve, or egress port means, which will allow the emptying out of the gas from within the hollow bag 20 of the inflated suit 12 at a rate such that the suit will become substantially fully deflated after a short time delay interval following the initial accident which caused the initial, almost immediate, inflation of the protective garment 12.

Thus, after said short time delay, the protective garment 12 will be deflated and this will facilitate removing the protective garment 12 from the motorcyclist's body 10 for treatment of any injuries which the motorcyclist may have received despite his wearing of the protective garment.

Also, it should be noted that the effectively delayed-emptying-action egress valve means indicated at 58 may be of a quick-dumping but time-delayed type responsive, after an appropriate short time delay, to some changing condition which occurs at the time of, or is a function of, the initial rapid inflation of the suit or protective garment 12. For example, each of said egress valve means 58 may be of a quick-dumping type which will open a certain predetermined number of seconds after it is initially pressurized at the time of the initial rapid inflation of the protective garment 12 immediately following an accident. Alternately, the egress valve means 58 may be so connected with respect to either of the tension-applying means 48 and 42, or even the corresponding inflating tube means 28, as to be physically pre-set for subsequent opening and dumping action after a predetermined time interval following the initial setting thereof by the application of tension thereto at the time of a motorcycle accident. In the event that the protective garment is being used for protective purposes by an individual other than a motorcyclist, such as a water skier or a person engaging in any of several different water sports, the effectively delayed-emptying-action egress valve means would be either not included as part of the protective garment because of the garment's intended use by a water sportsman, or the valve would be capable of being selectively rendered inoperable when the garment is intended to be used by a person engaging in water sports or the like. This would, of course, allow the inflated condition of the protective garment, after an accident, to continue, which would buoy up and support the person on the surface of the water until he could be rescued and treated for any possible injuries or, if not injured, until he could help himself back into a substantially pre-accident condition and orientation, either on his water skis or on a boat, float, platform, or the like.

Each of the pressurized gas supply means 30 may carry compressed air or compressed carbon dioxide or any other appropriate or suitable gas therein which will have the desired compressibility and protective garment-inflating characteristics and which also may be of a combustion-inhibiting, combustion-preventing, or thermally-protective type adapted to protect a motorcyclist to some degree from heat produced either frictionally from, or as a consequence of fire resulting from, a motorcycle accident.

Furthermore, it should be noted that the pressurized gas supply means 30 may, in certain forms of the invention, be mounted on, within, or carried by the protective garment and, in other cases, may be mounted on or carried by or within appropriate portions of the motorcycle itself. Both of such alternate arrangements, in addition to the one illustrated, lie within the broad scope of the present invention and are intended to be included and comprehended herein.

It should be clearly noted that while the protective garment has been described in the present specification primarily in connection with one of its uses, for protective purposes by a motorcyclist, this is exemplary and illustrative only and is not intended to be construed as limiting the protective garment to use by a motorcyclist only. The protective garment is intended for use by any person who is involved in some activity functionally equivalent to the riding of a motorcycle—in other words, any activity where rapid movement is involved and there is danger of a fall occurring, whether on land or water, and the foregoing description is to be broadly so construed.

The exemplary materials of which the various parts are made, and certain exemplary constructions thereof, are also to be construed as being illustrative only, rather than as limiting the scope of the present invention, which is defined substantially entirely by the appended claims.

I claim:

1. A protective garment for minimizing impact-caused injury to the body of a vehicle rider, the combination of:
   a. a suit adapted to be worn by said vehicle rider including an inflatable means which, when inflated will provide impact protection to the vehicle rider;
   b. inlet means for introducing gas into said inflatable means;
   c. a source of gas under pressure connected to said inlet means;
   d. detachable means connected to said source of gas under pressure and to said vehicle, said detachable means including means for permitting separation of said source of gas from said vehicle upon movement of said vehicle rider relative to said vehicle, said source of gas under pressure remaining connected to said inlet means after separation of said source of gas from said vehicle has occurred; and
   e. means whereby said valve is opened by said detachable means.

2. A protective garment for minimizing impact-caused injury to the body of a vehicle rider, the combination of:
   a. a suit adapted to be worn by said vehicle rider including an inflatable means which, when inflated will provide impact protection to the vehicle rider;
   b. inlet means for introducing gas into said inflatable means;
   c. a source of gas under pressure connected to said inlet means;
   d. a valve positioned to control the flow of gas from said source of gas to said inlet; and
   e. detachable means connected to said vehicle and said valve said detachable means including means for permitting separation of said valve from said vehicle operable upon movement of the rider relative to said vehicle to open said valve and to detach said valve from said vehicle, said source of gas under pressure and said valve remaining connected to said inlet after separation of said valve from said vehicle.

3. A combination as defined in claim 1 in which there are front and rear inlet means, sources of gas under pressure, detachable means, and valves whereby upon movement of the vehicle rider relative to said vehicle either forwardly or rearwardly will open at least one of said valve means whereby gas under pressure will be supplied to said inflatable means.

4. A combination as defined in claim 1 or claim 12 in which said detachable means is provided with controllable manually engageable and disengageable coupling means for allowing selective mounting and dismounting of said vehicle rider from said vehicle without causing said detachable means to be operated or said valve means to be opened.

5. A combination as defined in claim 1 in which said source of gas under pressure consists of a compressed gas receptable having an opening with a valve seated to close said opening whereby the interior of said receptable is in open connection with said inlet means.

* * * * *